United States Patent [19]

Harada

[11] Patent Number: 5,614,861
[45] Date of Patent: Mar. 25, 1997

[54] N-PHASE MODULATED SIGNAL DEMODULATION SYSTEM WITH CARRIER REPRODUCTION

[75] Inventor: Hiroyuki Harada, Kanagawa, Japan

[73] Assignee: Mitsubishi Denki Kabushiki Kaisha, Tokyo, Japan

[21] Appl. No.: 527,043

[22] Filed: Sep. 12, 1995

[30] Foreign Application Priority Data

May 18, 1995 [JP] Japan .................................. 7-120103

[51] Int. Cl.$^6$ ............................................. H04L 27/227
[52] U.S. Cl. ...................... 329/308; 329/309; 329/310; 375/326; 375/327; 375/328; 375/332
[58] Field of Search .................................. 329/304, 307, 329/308, 309, 310; 375/324, 325, 326, 327, 328, 329, 332

[56] References Cited

U.S. PATENT DOCUMENTS

| | | | |
|---|---|---|---|
| 4,308,503 | 12/1981 | Scott | 329/308 |
| 4,466,109 | 8/1984 | Sari | 329/309 |
| 5,440,268 | 8/1995 | Taga et al. | 329/309 |

OTHER PUBLICATIONS

"Manufacturing QPSK Digital Modulator–Demodulator," Electronics Life, NHK Publishing Society, 1992, pp. 81–91.

Primary Examiner—Siegfried H. Grimm
Attorney, Agent, or Firm—Oblon, Spivak, McClelland, Maier & Neustadt, P.C.

[57] ABSTRACT

A phase modulated signal demodulation system which is not affected by noise and distortion of an input signal. The system includes a carrier reproduction PLL circuit for generating a reproduction reference clock having a frequency which is N times of a carrier frequency which is synchronized with an N-phase phase modulated input signal, and a clock generation circuit for dividing the reproduction reference clock by 1/N and for generating N clocks, each of which has a different phase offset by 360°/N. The system further includes a phase detector which detects a phase of the N-phase phase modulated signal by using the N clocks together with the input N-phase phase modulated signal; and an operating circuit which detects a data edge of the input signal and the reproduction reference clock. The system further includes a data clock reproduction PLL circuit for generating a clock synchronized with a data rate using an output from the operating circuit, and a second clock generation circuit which generates a plurality of clocks for majority judgments using an output of the data clock reproduction PLL circuit. The system further includes a data protection circuit for protecting data generated by the phase detector, and a data generating circuit which outputs a corresponding digital data according to phase information outputted from the phase detector.

16 Claims, 11 Drawing Sheets

LOGIC VALUE TABLE OF DATA GENERATION CIRCUIT 5

| DETECTION OUTPUT \ PHASE INFORMATION OUTPUT | DATA OUTPUT 1 | DATA OUTPUT 2 |
|---|---|---|
| q = "H" | 0 | 0 |
| r = "H" | 1 | 0 |
| s = "H" | 1 | 1 |
| t = "H" | 0 | 1 |

N-PHASE MODULATED SIGNAL DEMODULATION SYSTEM WITH CARRIER REPRODUCTION

BACKGROUND OF THE INVENTION

1. Field of the Invention

The invention relates to a demodulating system of a phase modulate a signal (QPSK: Quad Phase Shift Keying) which transmits a digital data as a phase change of a carrier.

2. Description of the Prior Art

For the sake of explanation, a 4-phase modulated signal is described here as an example but it may be also applicable to 2-phase, 8-phase, 16-phase, 32-phase, and also more than 32-phase modulated signals.

FIG. 13 is a block diagram showing an example of a conventional 4-phase modulated signal demodulating system. In FIG. 13, a carrier reproduction PLL (Phase Locked Loop) 2 reproduces a clock synchronized with a carrier "a" of a signal which is inputted from a 4-phase modulated signal input terminal 1. Phase detectors 4a and 4b multiply a reference clock which is outputted from a phase shifter 12 by a 4-phase modulated signal which is inputted from an input terminal 1. A phase shifter 12 generates two kinds of clocks, each of which has the same frequency as a carrier frequency "a" and phase of ±45°, respectively. Each of comparators 13a and 13b outputs a signal "H" or "L" according to a signal provided from a respective phase detector 4a and 4b under a predetermined threshold level.

FIG. 14 shows examples of signals at different points of a conventional 4-phase modulated signal demodulation system. In FIG. 14, a: a 4-phase modulated signal to be demodulated;
b: a reference clock for demodulation;
c: a reference clock for demodulation;
d: a×b;
e: a×c;
f: a signal obtained after a signal d passed through a most appropriate and ideal LPF; and
g: a signal obtained after a signal e passed through a most appropriate and ideal LPF.

A demodulating operation of a conventional 4-phase modulated signal is described in reference to FIGS. 13 and 14. A 4-phase modulated signal inputted into an input terminal 1 reproduces a continuous clock signal with no phase change which is synchronized with a carrier of the input signal in a carrier reproduction PLL circuit 2. A costas loop system and a multiply system are generally used for this clock reproduction system. A clock signal outputted from the carrier reproduction PLL circuit fc, as shown in FIG. 13 (Prior Art), is supplied to the phase shifter 12, which generates two signals b, c each having phases of +45° and −45°, respectively, from the carrier reproduction PLL circuit signal fc. The reproduction carrier signals having the phase of +45° and −45° are inputted to respective phase detectors 4a, 4b as reference signals. The reference signals b, c are multiplied by the input carrier signal a, respectively, and the resultant signals d, e are generated, respectively, from the respective phase detectors 4a, 4b. The resultant signals d, e thus obtained are transmitted to a comparator 13 through LPF 29a, 29b, respectively. The input signals f, g are compared with a threshold value of a reference at a comparator 13a, 13b, respectively, and phase information of the input signals is convened to binary signals which are outputted from the data output terminals 6 and 7, respectively.

Binary signals are outputted from the data output terminals 6 and 7, respectively, and 4-phase information, which correspond to four phases of 0°, 90°, 180° and 270° of the carrier in the 4-phase modulated system, is obtained from the combination of the binary signals. Four-phase information obtained from data output terminals 6 and 7 represents demodulation information of the 4-phase modulated signal.

As explained above, a multiplication of a reference clock and an input signal is used for a phase detection in a conventional phase modulated signal demodulation system. Therefore, a noise in an input signal or a distortion in an input waveform affects a multiplication and deteriorates demodulation characteristics.

Also, a phase drift or a waveform distortion of clocks of ±45° which are used as reference for phase detection affects a multiplication and deteriorates demodulation characteristics.

Since a multiplication result is converted to a direct current signal by the LPF, the LPF characteristics also have a great influence on demodulation characteristics.

SUMMARY OF THE INVENTION

It is an object of the present invention to provide a phase modulated signal demodulation system which caries out demodulation having a low error rate even at low C/N by carrying out a phase judgment of the carrier, which is phase modulated by N-phase, using a clock synchronized with a carrier.

Further, it is another object of the present invention to provide a phase modulates signal demodulation system which can further reduce error rate at low C/N by arranging a data protection circuit.

Further, it is another object of the present invention to provide a phase modulated signal demodulation system which demodulates a phase modulating signal easily by generating demodulation cords corresponding to H level of any of N detection outputs.

Further, it is another object of the present invention to provide a phase modulated signal demodulation system which can easily take out a phase component of the phase modulated signal, by carrying out the exclusive OR operation between the QPSK input signal and a signals having different phases of ±45° from the reference clock.

Further, it is another object of the present invention to provide a phase modulated signal demodulation system which can easily take out a phase component of the phase modulated signal, by carrying out exclusive OR operation between an input signal with reference clock signals in each phase detector, and by latching the output by a latch clock having frequency of N times the carrier frequency, and by carrying out NOR operation of the output.

Further, it is another object of the present invention to provide a phase modulated signal demodulation system which can easily take out a phase component of the phase modulated signal, by latching the output from an exclusive OR using a reference clock having a frequency of N times the carrier frequency.

Further, it is another object of the present invention to provide a phase modulated signal demodulation system which easily takes out the correct phase information of the input signal by counting more than m times at n times judgements, and the result is read by the majority judgments determination pulse β and then cleared by the majority judgments counter clear pulse γ.

DETAILED DESCRIPTION OF THE PREFERRED EMBODIMENTS

Embodiment 1

Figure 1:
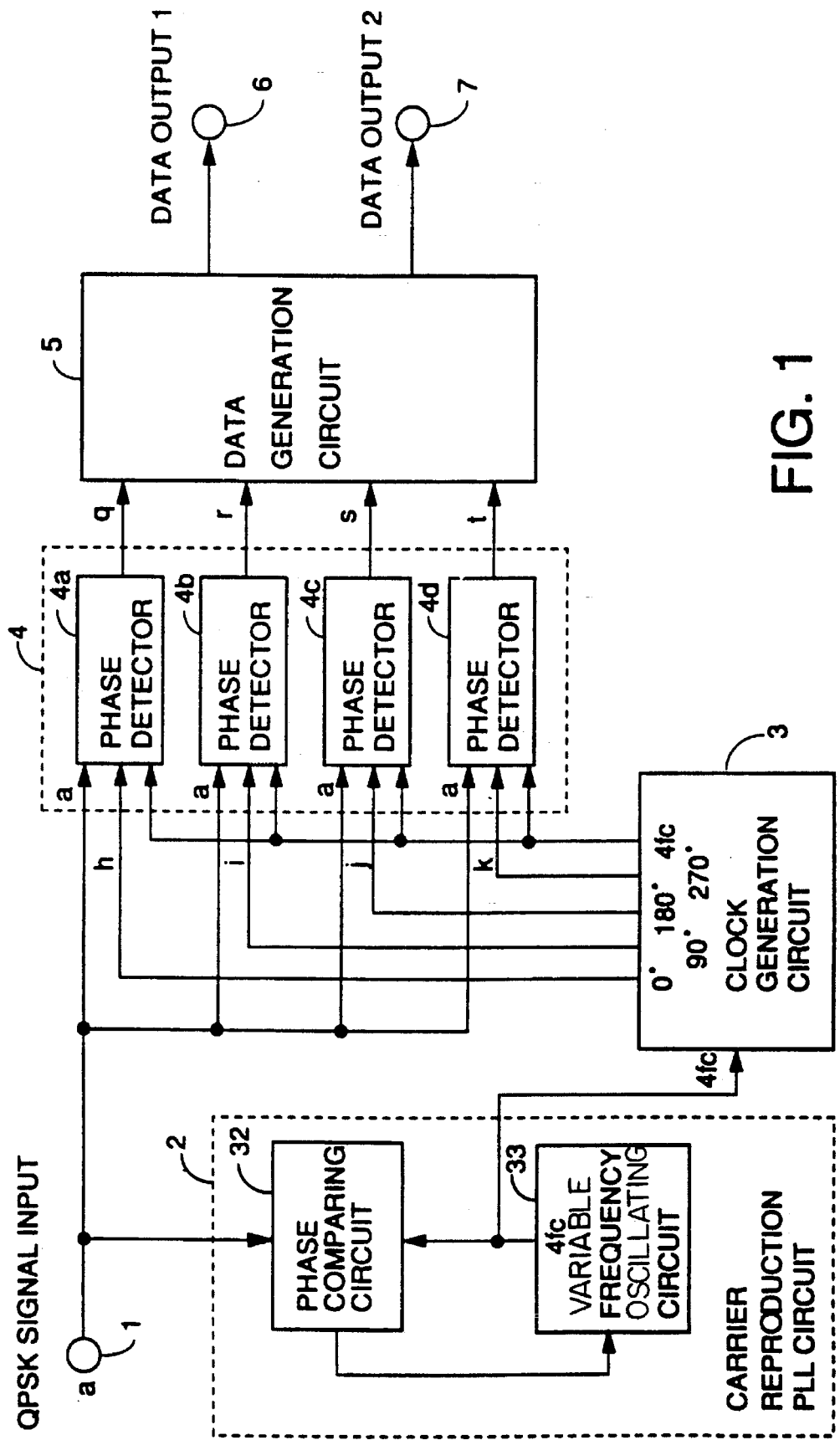
FIG. 1 shows a block diagram of an embodiment of the present invention.
Figure 13:
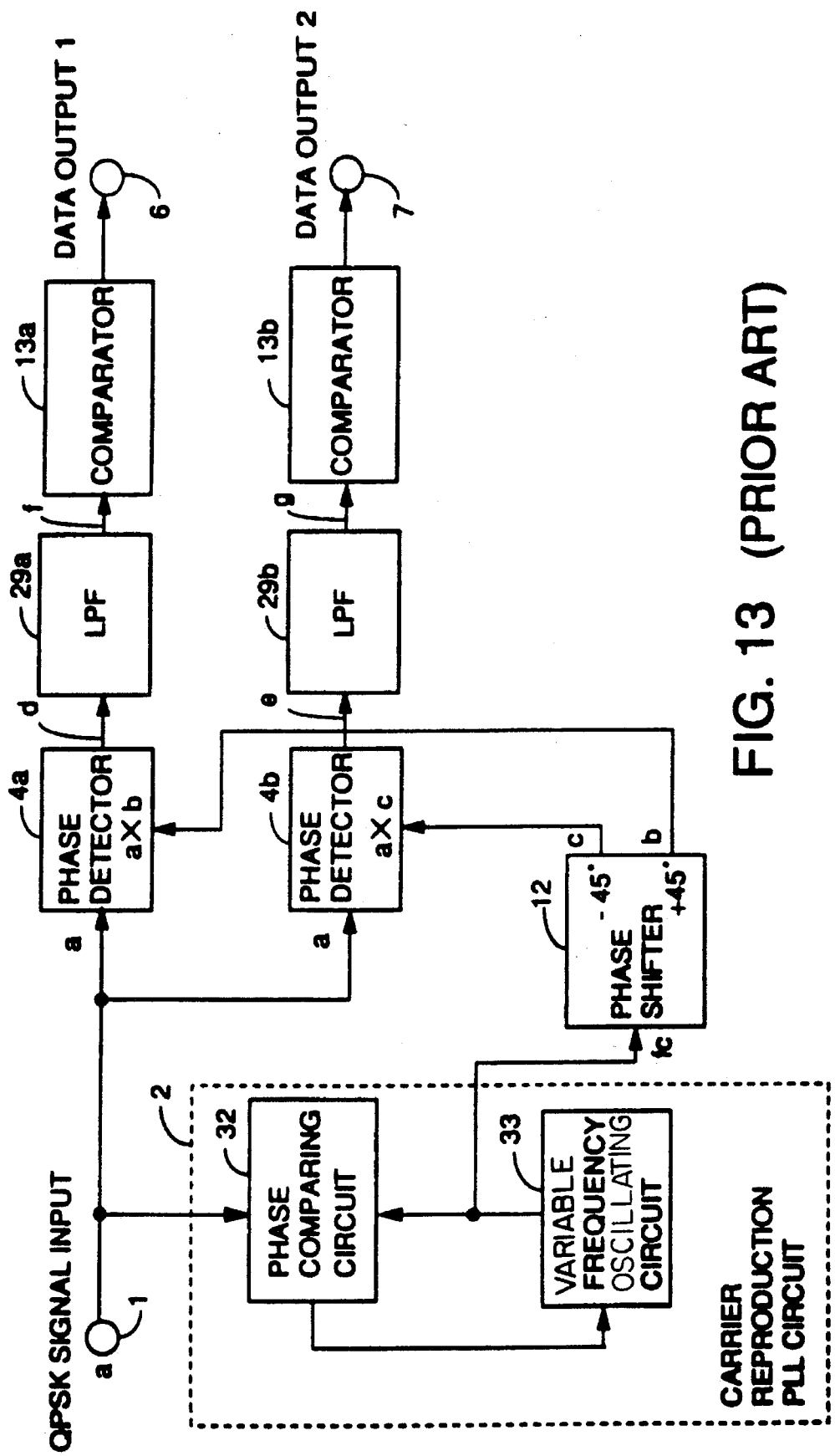
FIG. 13 shows a block diagram of conventional phase modulated signal demodulation system.
Figure 14:
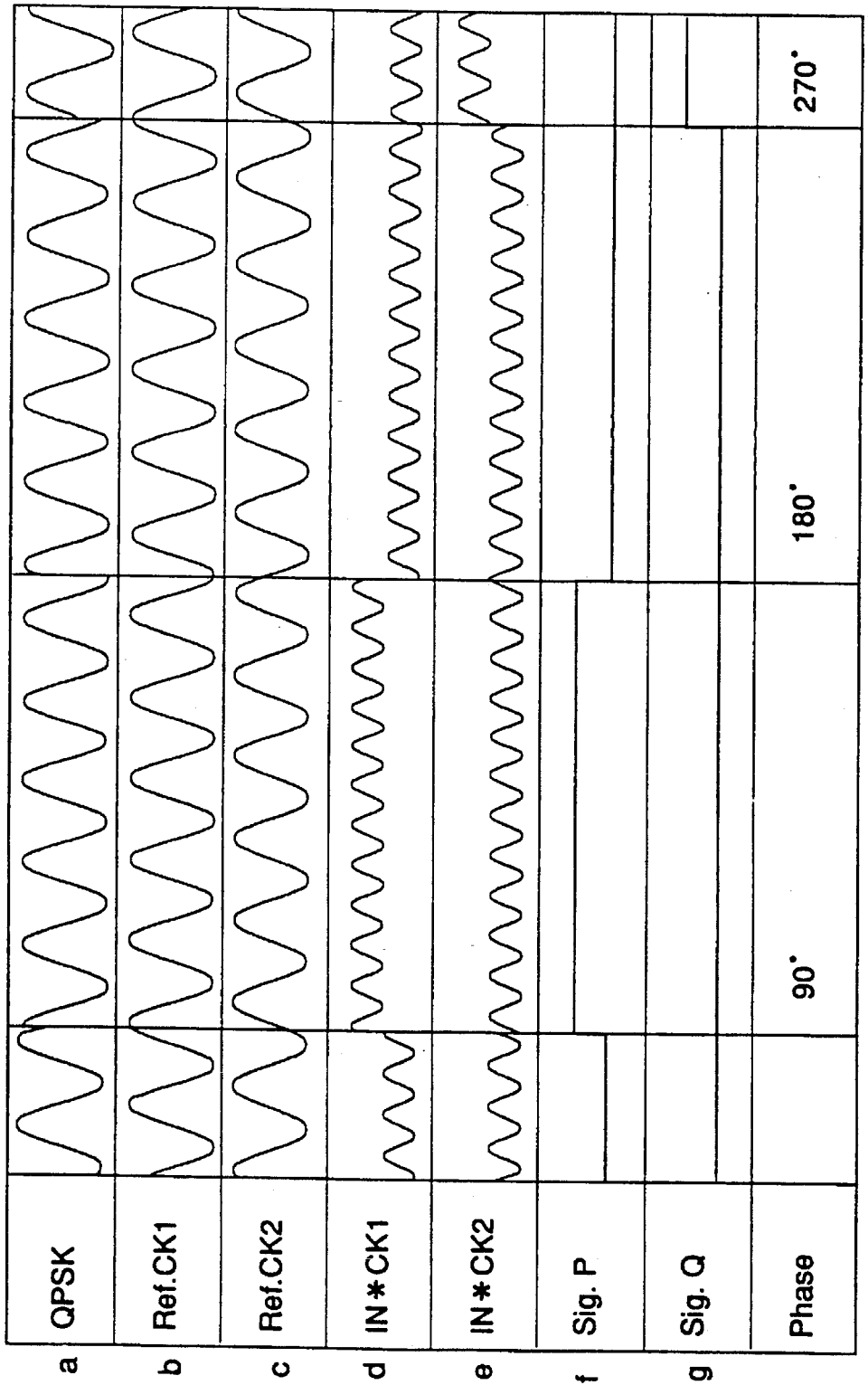
FIG. 14 is a timing chart of a conventional phase modulated signal demodulation system.

Following is an explanation on one embodiment of the present invention. FIG. 1 shows a block diagram of a 4-phase modulated signal demodulation system according to a first embodiment of the present invention. In FIG. 1, the numerals which are the same as those in FIG. 13 denote the same elements or apparatus and therefore further description is omitted.

First, a carrier reproduction PLL circuit 2 is explained below. The carrier reproduction PLL circuit 2 generates a clock which is synchronized with a carrier of an input signal. In the demodulation system of the invention, a modulation clock frequency of N×fc is needed when demodulating a phase modulated signal of N-phase. fc is a clock frequency of an input QPSK signal. An input QPSK signal "a" is compared with a frequency generated in a variable frequency oscillating circuit and then a difference signal between the two signals is fed back to a variable frequency oscillating circuit. The feedback circuit constitutes a PLL circuit. This PLL circuit changes a frequency and a phase of variable frequency oscillating circuit so that it synchronizes with a carrier of an input signal "a" to generate a clock having a frequency 4 fc which is synchronized with a carrier frequency fc of QPSK signal and has quadrupled frequency.

A clock generation circuit 3 generates 4 kinds of clocks (h (0), i (90°), j (180°), k (270°)) having a phase difference of 90° from each other from a carrier reproduction PLL circuit 2 and provides them to a phase detector 4. A phase detector 4 carries out an exclusive OR operation between a phase modulation signal "a" inputted from an input terminal 1 and a respective clock signal (h, i, j, k) and then provides operation resulting signals (q, r, s, t) to a data generation circuit 5.

Figures 5, 6:
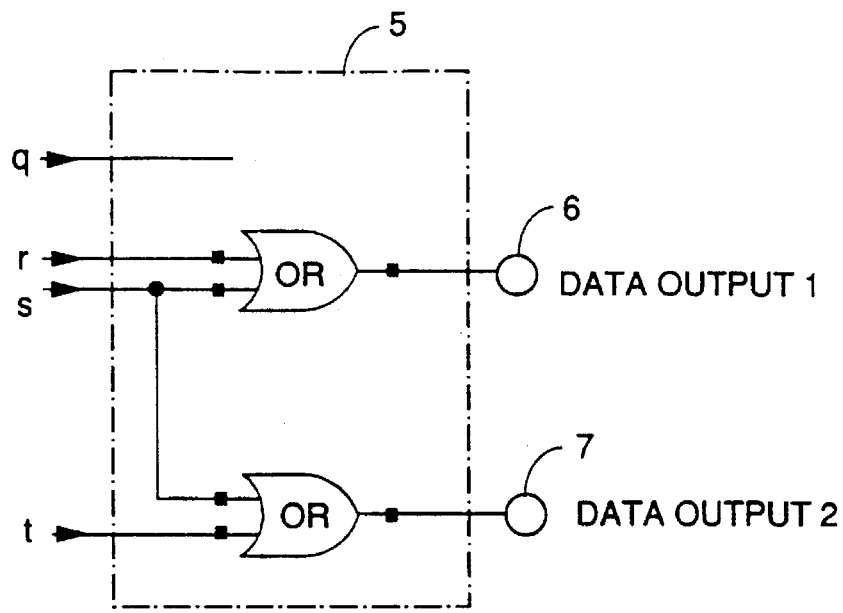
FIG. 5 shows a block diagram of a data generation circuit of the present invention.
FIG. 6 is a logical table of a data generation circuit of the present invention.

FIG. 5 shows a block diagram of data generation circuit 5 of the invention. FIG. 6 is a logic table which shows logical values of the data generation circuit. The data generation circuit 5 outputs four kinds of 2 bits data (00, 01, 10, 11) from the data output terminals 6 and 7 according to the logical table of FIG. 6 in response to the phase judgment result signals (q, r, s, t).

Figure 3:
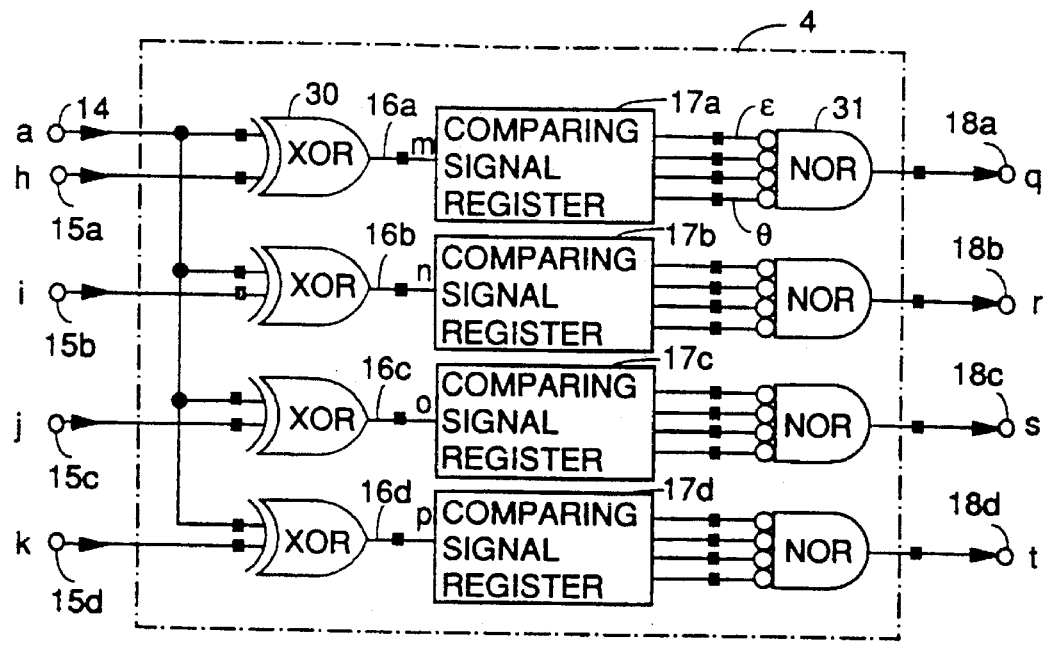
FIG. 3 shows a block diagram of a phase detector of the present invention.

FIG. 3 shows a block diagram of a phase detector 4. In FIG. 3, 4-phase phase modulated signal "a" is inputted from a phase modulating signal input terminal 14 and clocks (h, i, j, k) having phases of 0°, 90°, 180°, 270° are inputted from the reference clock input terminals 15a, 15b, 15c and 15d, respectively. Phase modulating signals and clock are exclusive ORed and their operation results are inputted into each comparison signal registers 17a, 17b, 17c and 17d, respectively.

Figure 4:
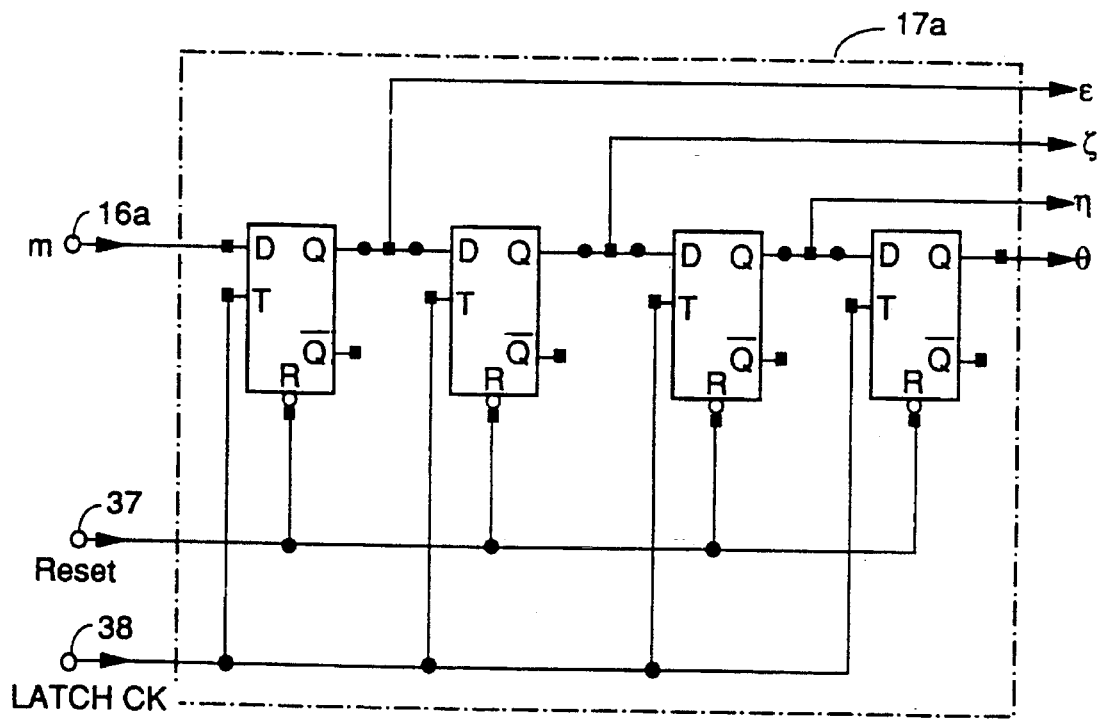
FIG. 4 shows a block diagram of comparing signal register of a phase detector of the present invention.

FIG. 4 shows a block diagram of comparison signal register 17a. Comparison signals m which is inputted into comparison signal register 17a from XOR circuit 30 is compared with a comparison signal latch clock which is inputted from the comparison signal latch clock input terminal 38 for m-times (at least 4 times in case of 4-phase phase modulating signal). The result is inputted into an input NOR 31 and a phase judgment of a phase modulated signal is carried out. This process is the same as those of the comparison signal registers 17b–17d.

When reading out signals at each rising edge (m, n, o, p) of 4 fc clock, for example, an output of NOR gate 31 becomes "H" if all reading outputs ($\xi, \delta, \eta, \theta$) are "L". When only one of the reading outputs ($\xi, \delta, \eta, \theta$) is "L", an output of NOR gate 31 becomes "L". Phase judgement outputs 18 (q, r, s, t) are thus obtained. When a phase is judged, the D flip-flops are reset by a reset signal which is inputted from a Reset terminal 37. In this block diagram, as easily understood from phase judgement outputs 18 (q, r, s, t) in FI6. 7, a phase having "H" level among any one of q, r, s, t shows a phase of an input signal. In other words, in a partition where a phase judgment signal q is "H", a phase of an input signal shows 0°, in a partition where a phase judgment signal r is "H", a phase of an input signal shows 90°, in a partition where a phase judgment signal s is "H", a phase of an input signal shows 180° and in a partition where a phase judgment signal t is "H", a phase of an input signal shows 270°.

Figure 7:
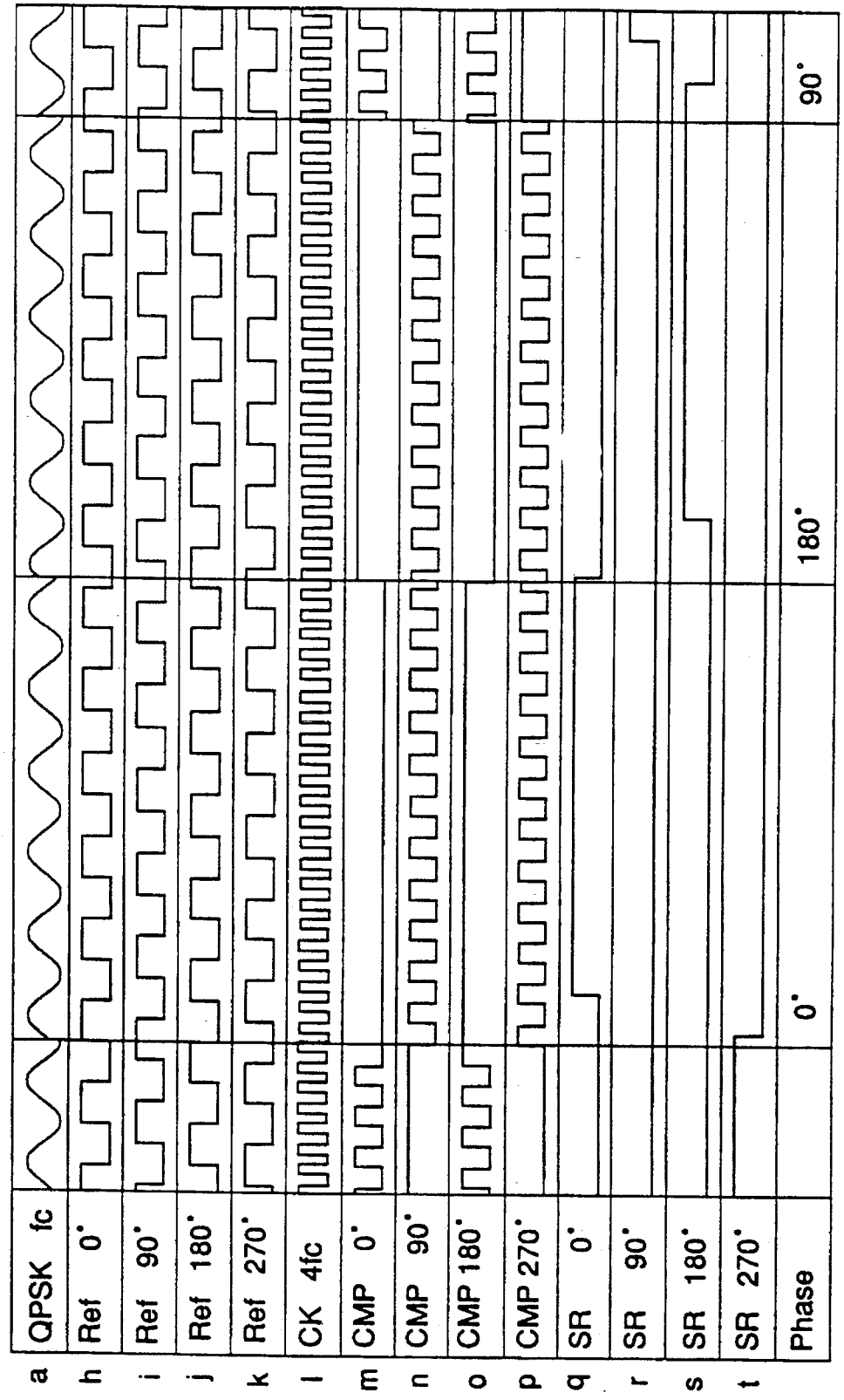
FIG. 7 is an operation timing chart of the present invention.

FIG. 7 is a timing diagram showing an operation of a phase detector. In FIG. 7, a: 4-phase modulated signal to be demodulated
h: Reference clock 1 for demodulation (0°)
i: Reference clock 2 for demodulation (90°)
j: Reference clock 3 for demodulation (180°)
k: Reference clock 4 for demodulation (270°)
l: Clock having frequency which is N times of carrier (4 fc)
m: A * h (XOR output between a 4-phase phase modulated signal and a reference clock 1)
n: A * i (XOR output between a 4-phase phase modulated signal and a reference clock 2)
o: A * j (XOR output between a 4-phase phase modulated signal and a reference clock 3)
p: A * k (XOR output between a 4-phase phase modulated signal and a reference clock 4)
q: Phase judging output 1
r: Phase judging output 2
s: Phase judging output 3
t: Phase judging output 4

Embodiment 2

Figure 2:
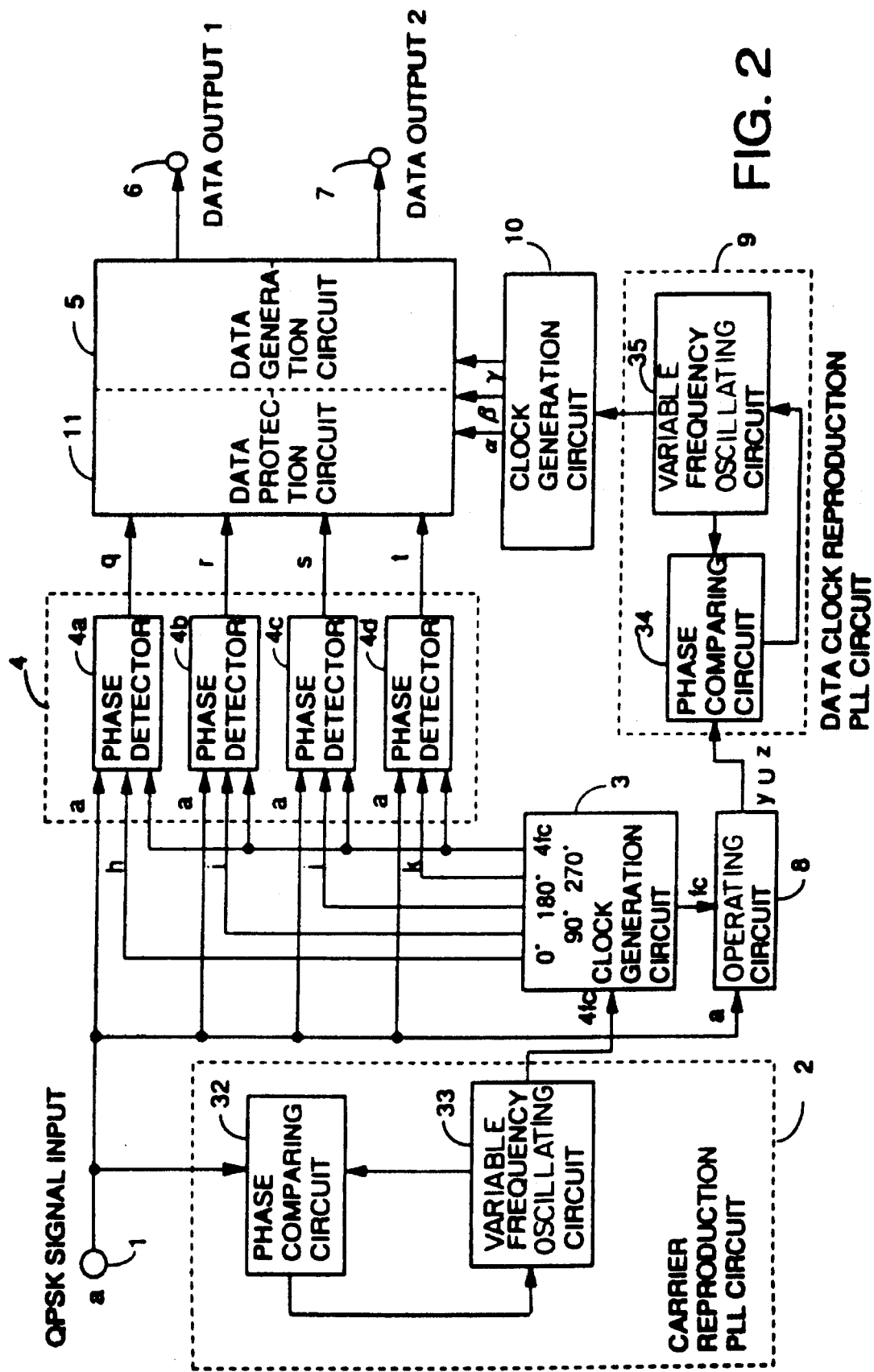
FIG. 2 shows a block diagram of another embodiment of the present invention.

FIG. 2 shows a block diagram of a 4-phase modulated signal demodulation system in a second embodiment of the invention. In FIG. 2, clock generation circuit 3, in addition to FIG. 1 generates a signal fc which is synchronized with one of the four phases of an input signal "a" and has the same frequency as the input signal "a" in order to precisely extract a data partition which shows a phase change of an input signal "a".

Further, FIG. 2 includes an operating circuit 8 for generating a reference signal from fc and input signal "a" to supply reference signal to a data clock reproduction PLL circuit 9, for obtaining a clock synchronized with a transmitted data. FIG. 2 also includes a clock generation circuit 10 for supplying clocks at $\alpha$, $\beta$ and $\gamma$ and a data protection circuit 11 for carrying out a majority judgement and a data compensation in case of abnormal operation.

Figure 8:
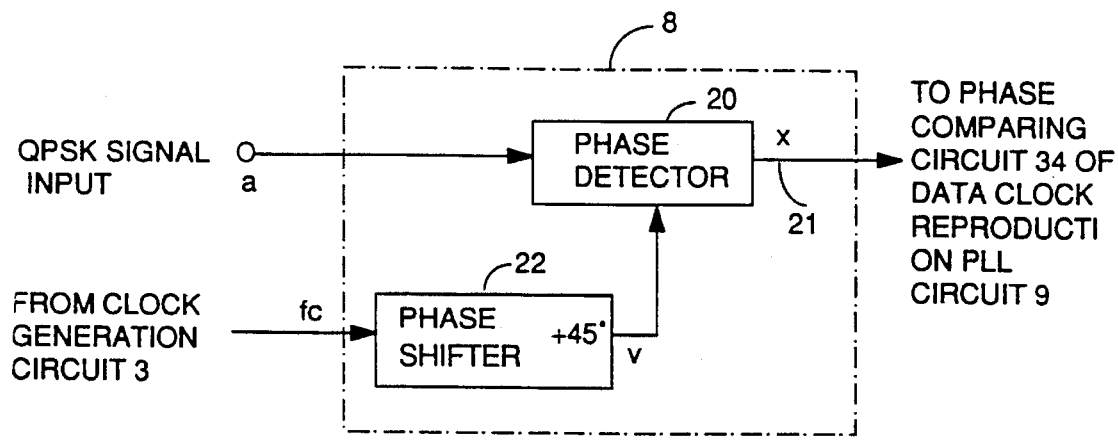
FIG. 8 shows a block diagram of arithmetic circuit of the present invention.

FIG. 8 shows a block diagram of an embodiment of operating circuit 8 in FIG. 2. The block diagram comprises a phase shifter 22 and a phase detector 20 which correspond to the phase shifter 12 and a phase detector 4, respectively, in the conventional phase modulating signal demodulation system shown in FIG. 13. QPSK input signal "a" is multiplied such as (a×v) with a signal v which is equal to clock fc advanced by 45°. A phase detection is carried out by the multiplication. A signal x which is phase detected is outputted from a terminal 21 to be outputted and transmitted to a data clock reproduction PLL circuit 9.

Figure 9:
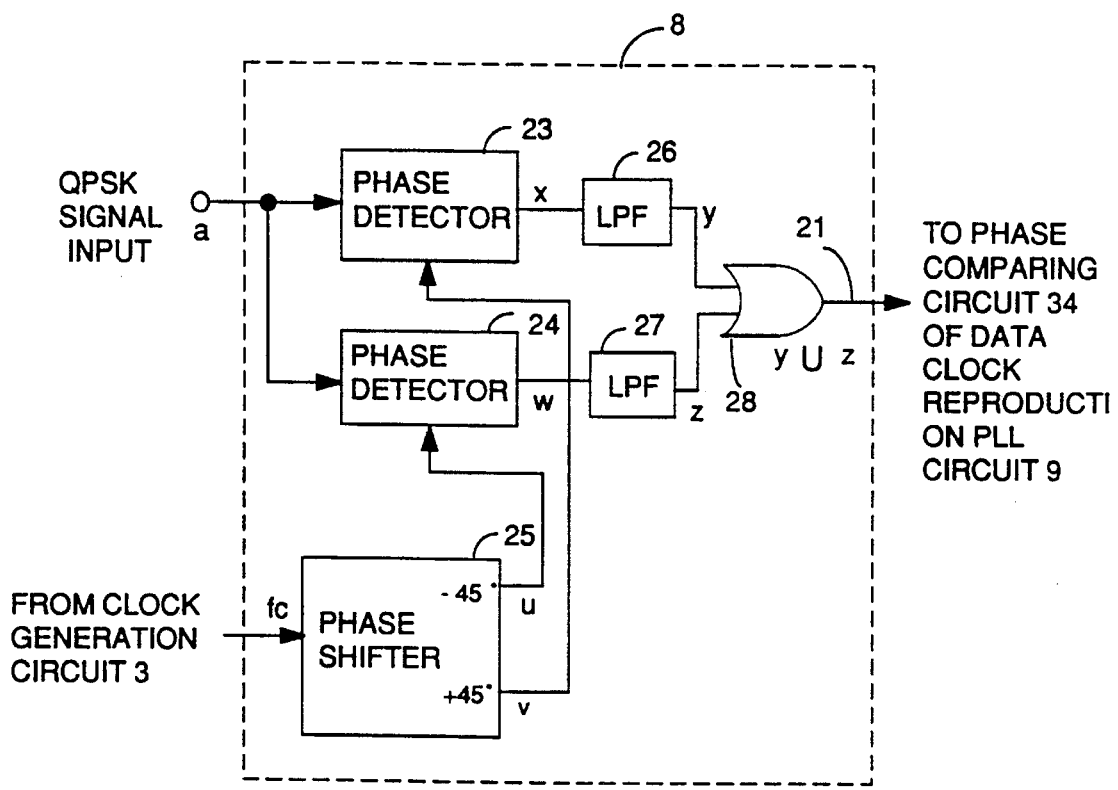
FIG. 9 shows a block diagram of another arithmetic circuit of the present invention.

On the other hand, FIG. 9 shows another embodiment of an operating circuit 8. The block diagram comprises a phase shifter 25 and phase detectors 23, 24 which correspond to the phase shifter 12 and a phase detector 4a, 4b, respectively, in the conventional phase modulated signal demodulation system shown in FIG. 13.

Figure 10:
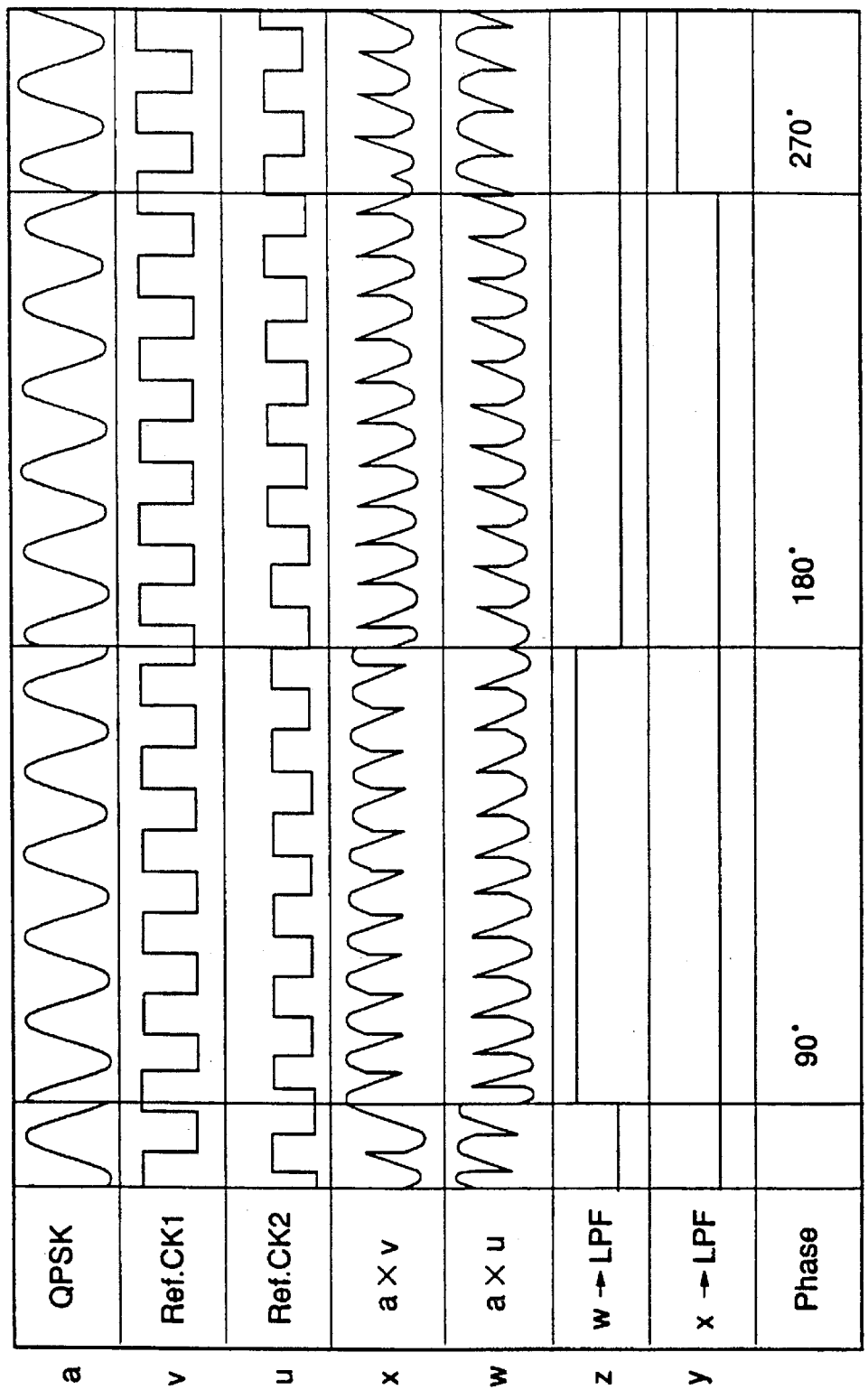
FIG. 10 is an operation timing chart of FIG. 8 and FIG. 9.

FIG. 10 is a timing chart showing operation of operating circuit 8 shown in FIG. 8 and FIG. 9. Further operations of FIG. 8 and FIG. 9 are described in FIG. 10. QPSK input signal "a" is multiplied such as (a×u) by a signal "u" which lags 45° from the clock fc and is multiplied such as (a×v) by a signal "v" which advances 45° from clock fc, respectively, at the phase detectors 4a and 4b and thus the phase detection is carried out. Respective outputs "w" and "x" are filtered at each low-pass filter LPF 26, 27 and are outputted as signals "y" and "z". The phase detected signals "y" and "z" are applied to OR circuit 28 and outputted from terminal 21. The output signal from the terminal 21 is outputted to a data clock reproduction PLL circuit 9 in FIG. 2. This signals "y" and "z" indicate information which shows data in one partition of a QPSK signal as shown in the character "Phase" in FIG. 10. An output of the operating circuit 8 is applied to data clock reproduction PLL circuit 9.

The data clock reproduction PLL circuit 9 comprises a phase comparison circuit 34 and variable frequency oscillating circuit 35. The data clock reproduction PLL circuit 9 compares an output frequency from the operating circuit 8 with a frequency multiplied by integer number times of the output frequency of an operating circuit 8 and generates a clock synchronized with a data rate of QPSK signal.

Figure 11:
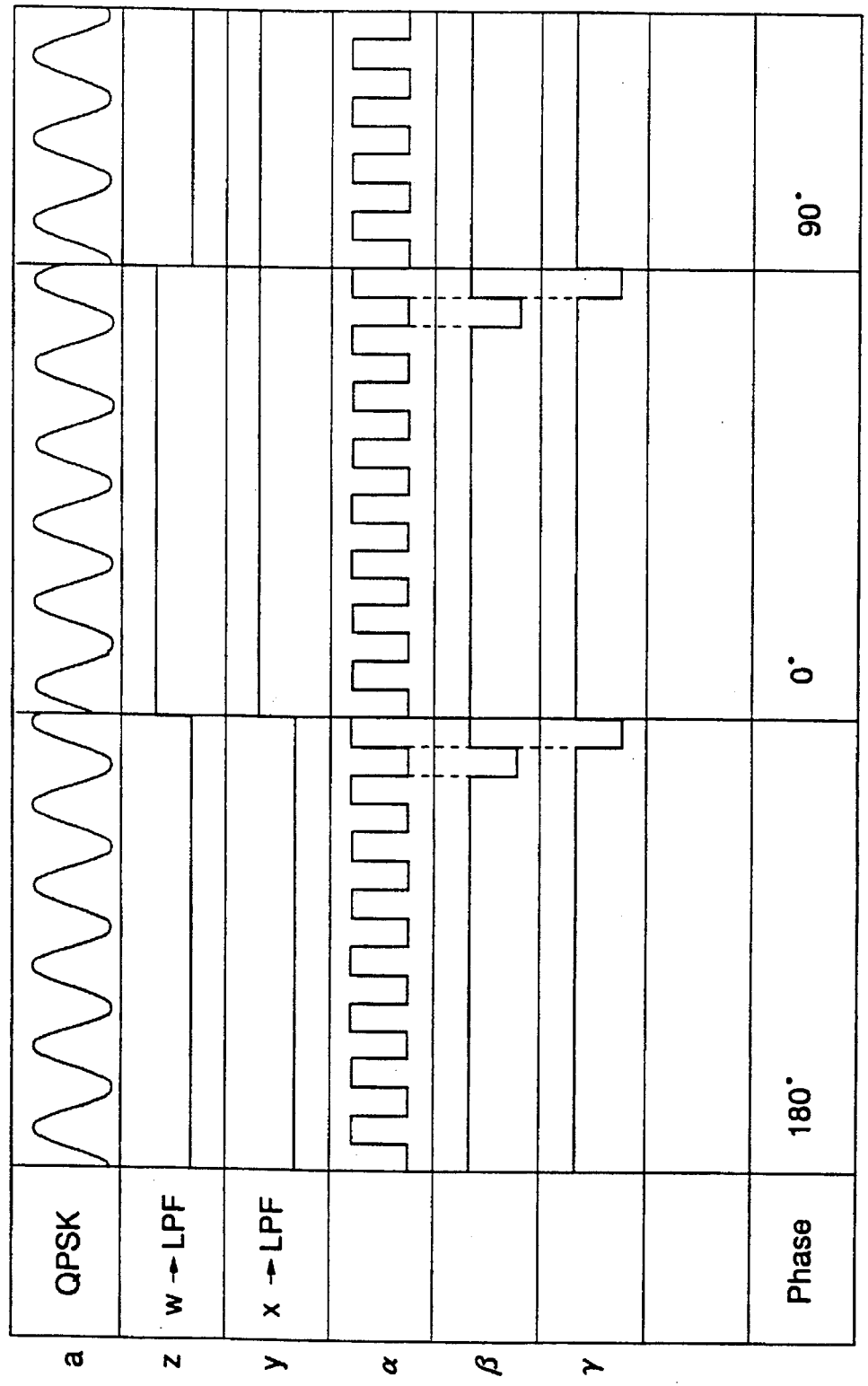
FIG. 11 is an operation timing chart of a clock generation circuit 10.

FIG. 11 shows an operation timing chart of a clock generation circuit 10. Output clock of data clock reproduction PLL circuit 9 is supplied to a clock generation circuit 10 and three clock signals $\alpha$, $\beta$ and $\gamma$, as shown in FIG. 11, are generated in the clock generation circuit 10 and they are supplied to a succeeding data protection circuit 11. Where, $\alpha$ is a counter latch clock for majority decision, $\beta$ is a majority result determining pulse and $\gamma$ is a counter clear pulse for majority decision. "y" and "z" become a reference of a signal showing one partition of data synchronized with "a". The data clock reproduction PLL circuit 9 regenerates a clock showing a partition of data according to the references "y", "z". $\alpha$, $\beta$ and $\gamma$ may take any timing as long as they can complete a series of operation precisely in one partition of data. $\alpha$ may be chosen so that it is counted at least m times in an arbitrary partition of the data. Usually, $\alpha$ is chosen so that it is counted more than m+1 times since $\beta$ and $\gamma$ are generated from $\alpha$. $\beta$ is a pulse which is generated after pulses of $\alpha$ being counted by m times in an arbitrary partition. $\gamma$ is a pulse which is generated just before entering into a next partition after the pulse $\beta$ is generated.

Figure 12:
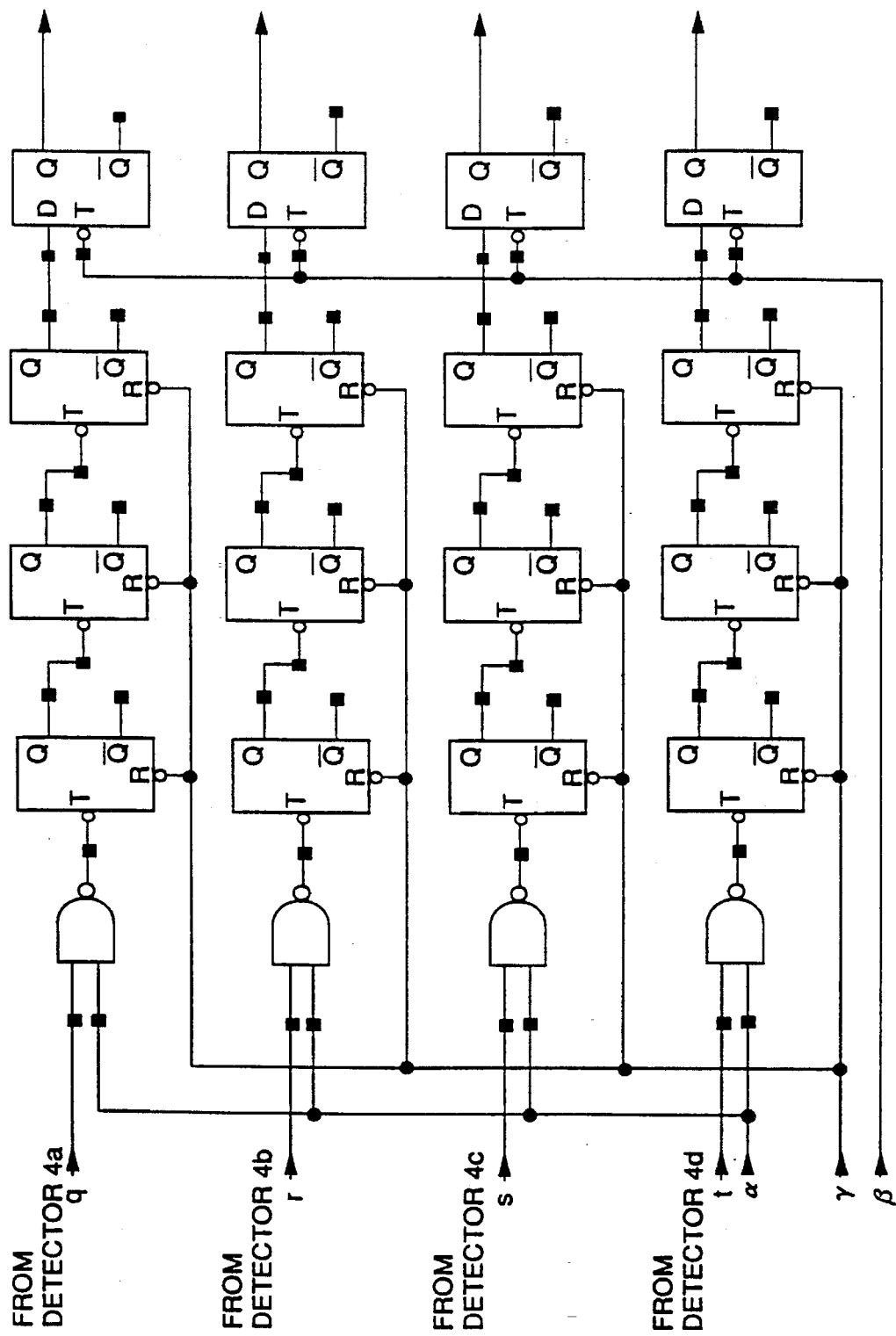
FIG. 12 shows a block diagram of data protection circuit 11.

FIG. 12 shows a block diagram of an embodiment of data protection circuit 11. Data protection circuit 11 comprises a three stage counter by T-flip-flops (FF) for counting outputs from four phase detectors 4 (q, r, s, t), respectively, according to a counter latch clock $\alpha$ generated from clock generation circuit 10 for majority judgments. In the present invention, when an output "H" of more than n times is counted at m times judgement, "H" is judged to be detected at majority judgment. In FIG. 12, an example is shown in case of m=7, n=4. A judgment result is read by majority judgment result determination pulse $\beta$ and then it is cleared by a counter clear pulse $\gamma$. In case of n=4, an output where "H" is counted more than 4 times out of seven counting is judged to be an output "H" as a result of majority judgement and the result is taken into a register comprised of D flip-flop in response to a majority judgment result determination pulse $\beta$. A counter comprised of T flip-flops is cleared in response to a majority judgment counter clear pulse $\gamma$ in order to carry out a similar majority judgment within a partition of next data. This operation is repeated again to protect data by majority judgments of data.

In a unit time corresponding to the transmitted data rate, the data protection circuit 11 samples the outputs (q, r, s, t) from the phase detectors 4a, 4b, 4c and 4d, respectively, for several times, and then carries out majority judgement for the sampling result. Even if a plurality of data changes by mistake in the unit time corresponding to transmitted data rate, the data protection circuit 11 can maintain data in a right state. According to the protection function of the data protection circuit 11, it is possible to improve reliability of data even if the output of phase detector 4 changes for several times in a unit time corresponding to the transmitted rate of data.

In another embodiment, it is also possible to provide a data protection circuit with the following function. Only one output among four outputs from phase detectors 4a, 4b, 4c and 4d can be "H" in a normal state. However, in case that more than one output becomes "H" due to noise etc, or in case that all outputs become "L" to prevent a normal judgement of data, a preceding value hold function can be provided which outputs preceding correct data by preventing generation of majority judgment result determination pulse $\beta$. Where the majority judgment result determination pulse $\beta$ is a latch clock of majority judgment result the hold register is comprised of a D flip-flop which maintains a majority judgment result. Also, another function to compensate data can be provided by changing data of any one of the majority judgment result hold registers into "H" state using a pseudo random number.

What is claimed is:

1. An N-phase phase modulated signal demodulation system comprising:

a carrier reproduction PLL circuit for generating a reproduction reference clock having a frequency which is N times that of a carrier frequency which is synchronized with an N-phase phase modulated signal inputted from an input terminal;

a clock generation circuit for dividing said reproduction reference clock by 1/N and for generating N clocks, each of which has different phase offset by 360°/N;

a phase detector which detects a phase of said N-phase phase modulated signal by using said N clocks obtained from said clock generation circuit together with an input of said N-phase phase modulated signal; and a data generating circuit which outputs corresponding digital data according to the phase detected by said phase detector.

2. A phase modulated signal demodulation system comprising:

a carrier reproduction PLL circuit for generating a reproduction reference clock having a frequency which is N times that of a carrier frequency which is synchronized with an N-phase phase modulated signal inputted from an input terminal;

a clock generation circuit for dividing said reproduction reference clock by 1/N and for generating N clocks, each of which has different phase offset by 360°/N;

a phase detector which detects a phase of said N-phase phase modulated signal by using said N clocks obtained from said clock generation circuit together with an input of said N-phase phase modulated signal;

an operating circuit which detects data edges of said N-phase phase modulated signal using said reproduction reference clock;

a data clock reproduction PLL circuit for generating a clock synchronized with said data edges of said N-phase phase modulated signal using an output from said operating circuit;

a second clock generation circuit which generates a plurality of clocks using an output of said data clock reproduction PLL circuit;

a data protection circuit for protecting phase information of said N-phase phase modulated signal output from said phase detector; and a data generating circuit which outputs corresponding digital data according to phase information of said N-phase phase modulated signals protected by said data protection circuit.

3. A phase modulated signal demodulation system of claim 1, wherein said data generating circuit generates a demodulation code corresponding to any one of N detection output levels.

4. A phase modulated signal demodulation system of claim 2, wherein said data generating circuit generates a demodulation code corresponding to any one of N detection output levels.

5. A phase modulated signal demodulation system of claim 2, wherein said N-phase phase modulated signal is a QPSK input signal, and said operating circuit comprises a phase shifter of 45° and a phase detector for multiplying said QPSK input signal with a signal having a phase advanced by 45° from a reference clock.

6. A phase modulated signal demodulation system of claim 2, wherein said N-phase phase modulated signal is a QPSK input signal, and said operating circuit further comprises:

a phase shifter producing signals advanced by 45° and lagging by 45° relative to a reference clock; and a phase detector multiplying said QPSK input signal by signals produced from said phase shifter.

7. A phase modulated signal demodulation system of claim 1, wherein said phase detector further comprises a series of detection banks each corresponding to one of said N clocks, and each detection bank comprising:

an exclusive OR gate, a comparing register, and a logical gate;

said exclusive OR gate carrying out an exclusive OR operation between an input of said N-phase phase modulated signal and a respective one of said N clocks to produce an output applied to a respective comparing register, and said comparing register producing an output applied to said logical gate to determine the phase of said N-phase phase modulated signal relative to the respective one of said clocks.

8. A phase modulated signal demodulation system of claim 2, wherein said phase detector further comprises a series of detection banks each corresponding to one of said N clocks, and each detection bank comprising:

an exclusive OR gate, a comparing register, and a logical gate;

said exclusive OR gate carrying out an exclusive OR operation between an input of said N-phase phase modulated signal and a respective one of said N clocks to produce an output applied to a respective comparing register, and said comparing register producing an output applied to said logical gate to determine the phase of said N-phase phase modulated signal relative to the respective one of said clocks.

9. A phase modulated signal demodulation system of claim 7, wherein each said comparing register comprises a cascade connection of a plurality of D flip-flops;

a first of said cascaded plurality of D flip-flops having an input to which is applied the output of the respective exclusive OR gate and which is propagated throughout said cascaded plurality of D flip-flops in synchronization with said reproduction reference clock to the output of said comparing register.

10. A phase modulated signal demodulation system of claim 8, wherein each said comparing register comprises a cascade connection of a plurality of D flip-flops;

a first of said cascaded plurality of D flip-flops having an input to which is applied the output of the respective exclusive OR gate and which is propagated throughout said cascaded plurality of D flip-flops in synchronization with said reproduction reference clock to the output of said comparing register.

11. A phase modulated signal demodulation system of claim 2, comprising:

said second clock generation circuit producing signals $\alpha$, $\gamma$, $\beta$;

said phase detector further comprising a plurality of outputs;

said data protection circuit having a series of data count arrays, one said data count array for each of said phase detector outputs;

each said data count array comprising a NAND gate, a cascade connection of T flip-flops, and a D flip-flop;

each NAND gate having as inputs said signal $\alpha$ and a respective output of said phase detector, and having an output applied to said cascade connection of T flip-flops;

said cascade connection of T flip-flops forming a majority counter, said majority counter outputting a majority value of said phase detector output in synchronization with signal α;

said cascaded T flip-flops having an output input into said D flip-flop in synchronization with said signal β;

said cascaded T flip-flops being reset in synchronization with said signal γ;

each said D flip-flop corresponding to each said data count array forming said phase information of said N-phase phase modulated signals.

12. A phase modulated signal demodulation system of claim 4, comprising:

said second clock generation circuit producing signals α, γ, β;

said phase detector further comprising a plurality of outputs;

said data protection circuit having a series of data count arrays, one said data count array for each of said phase detector outputs;

each said data count array comprising a NAND gate, a cascade connection of T flip-flops, and a D flip-flop;

each NAND gate having as inputs said signal α and a respective output of said phase detector, and having an output applied to said cascade connection of T flip-flops;

said cascade connection of T flip-flops forming a majority counter, said majority counter outputting a majority value of said phase detector output in synchronization with signal α;

said cascaded T flip-flops having an output input into said D flip-flop in synchronization with said signal β;

said cascaded T flip-flops being reset in synchronization with said signal γ;

each said D flip-flop corresponding to each said data count array forming said phase information of said N-phase phase modulated signals.

13. A phase modulated signal demodulation system of claim 6, comprising:

said second clock generation circuit producing signals α, γ, β;

said phase detector further comprising a plurality of outputs;

said data protection circuit having a series of data count arrays, one said data count array for each of said phase detector outputs;

each said data count array comprising a NAND gate, a cascade connection of T flip-flops, and a D flip-flop;

each NAND gate having as inputs said signal α and a respective output of said phase detector, and having an output applied to said cascade connection of T flip-flops;

said cascade connection of T flip-flops forming a majority counter, said majority counter outputting a majority value of said phase detector output in synchronization with signal α;

said cascaded T flip-flops having an output input into said D flip-flop in synchronization with said signal β;

said cascaded T flip-flops being reset in synchronization with said signal γ;

each said D flip-flop corresponding to each said data count array forming said phase information of said N-phase phase modulated signals.

14. A phase modulated signal demodulation system of claim 5, comprising:

said second clock generation circuit producing signals α, γ, β;

said phase detector further comprising a plurality of outputs;

said data protection circuit having a series of data count arrays, one said data count array for each said phase detector outputs;

each said data count array comprising a NAND gate, a cascade connection of T flip-flops, and a D flip-flop;

each NAND gate having as inputs said signal α and a respective output of said phase detector, and having an output applied to said cascade connection of T flip-flops;

said cascade connection of T flip-flops forming a majority counter, said majority counter outputting a majority value of said phase detector output in synchronization with signal α;

said cascaded T flip-flops having an output input into said D flip-flop in synchronization with said signal β;

said cascaded T flip-flops being reset in synchronization with said signal γ;

each said D flip-flop corresponding to each said data count array forming said phase information of said N-phase phase modulated signals.

15. A phase modulated signal demodulation system of claim 8, comprising:

said second clock generation circuit producing signals α, γ, β;

said phase detector further comprising a plurality of outputs;

said data protection circuit having a series of data count arrays, one said data count array for each of said phase detector outputs;

each said data count array comprising a NAND gate, a cascade connection of T flip-flops, and a D flip-flop;

each NAND gate having as inputs said signal α and a respective output of said phase detector, and having an output applied to said cascade connection of T flip-flops;

said cascade connection of T flip-flops forming a majority counter, said majority counter outputting a majority value of said phase detector output in synchronization with signal α;

said cascaded T flip-flops having an output input into said D flip-flop in synchronization with said signal β;

said cascaded T flip-flops being reset in synchronization with said signal γ;

each said D flip-flop corresponding to each said data count array forming said phase information of said N-phase phase modulated signals.

16. A phase modulated signal demodulation system of claim 10, comprising:

said second clock generation circuit producing signals α, γ, β;

said phase detector further comprising a plurality of outputs;

said data protection circuit having a series of data count arrays, one said data count array for each of said phase detector outputs;

each said data count array comprising a NAND gate, a cascade connection of T flip-flops, and a D flip-flop;

each NAND gate having as inputs said signal α and a respective output of said phase detector, and having an output applied to said cascade connection of T flip-flops;

said cascade connection of T flip-flops forming a majority counter, said majority counter outputting a majority value of said phase detector output in synchronization with signal $\alpha$;

said cascaded T flip-flops having an output input into said D flip-flop in synchronization with said signal $\beta$;

said cascaded T flip-flops being reset in synchronization with said signal $\gamma$;

each said D flip-flop corresponding to each said data count array forming said phase information of said N-phase phase modulated signals.

* * * * *